Patented Aug. 12, 1952

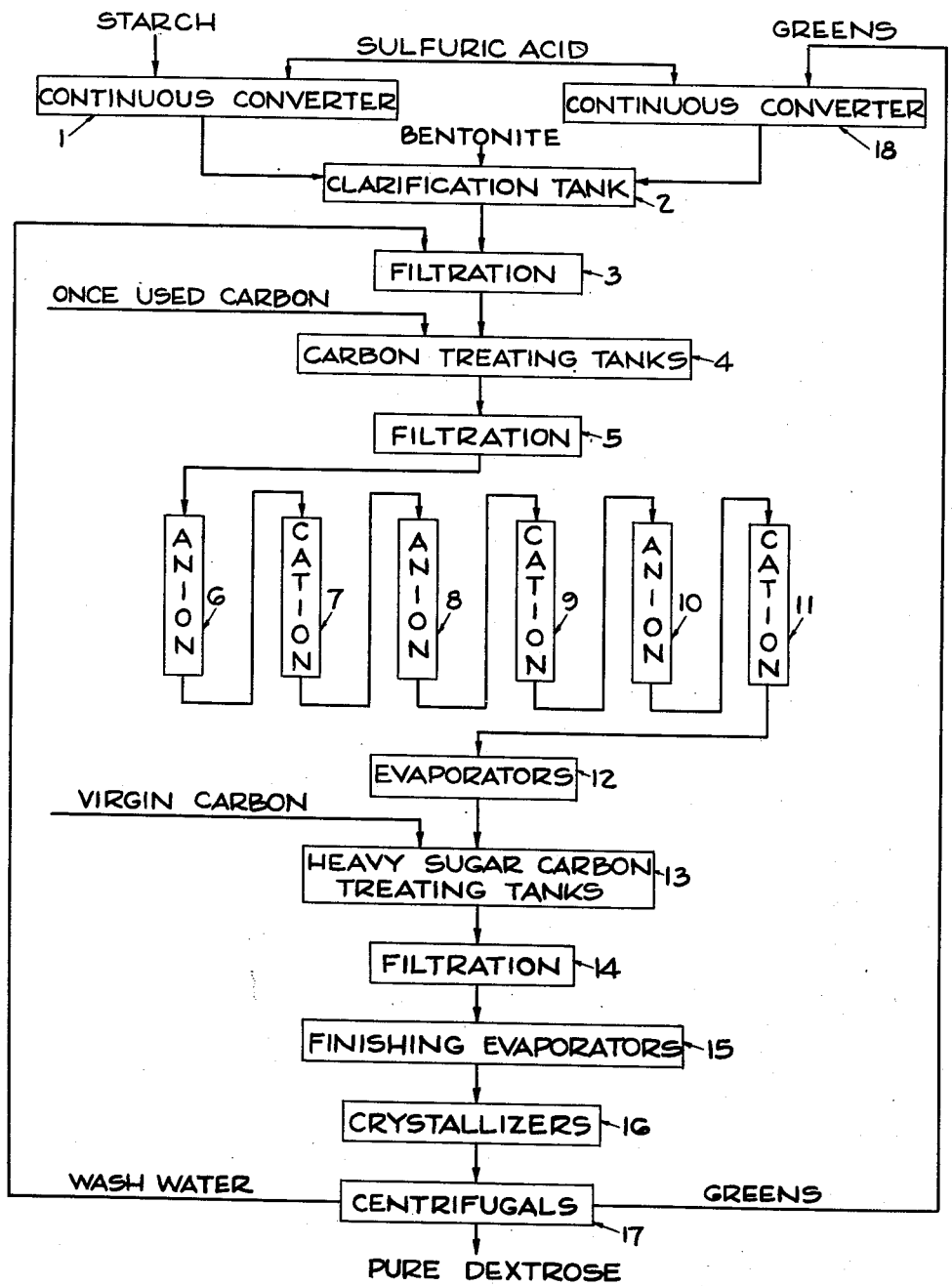

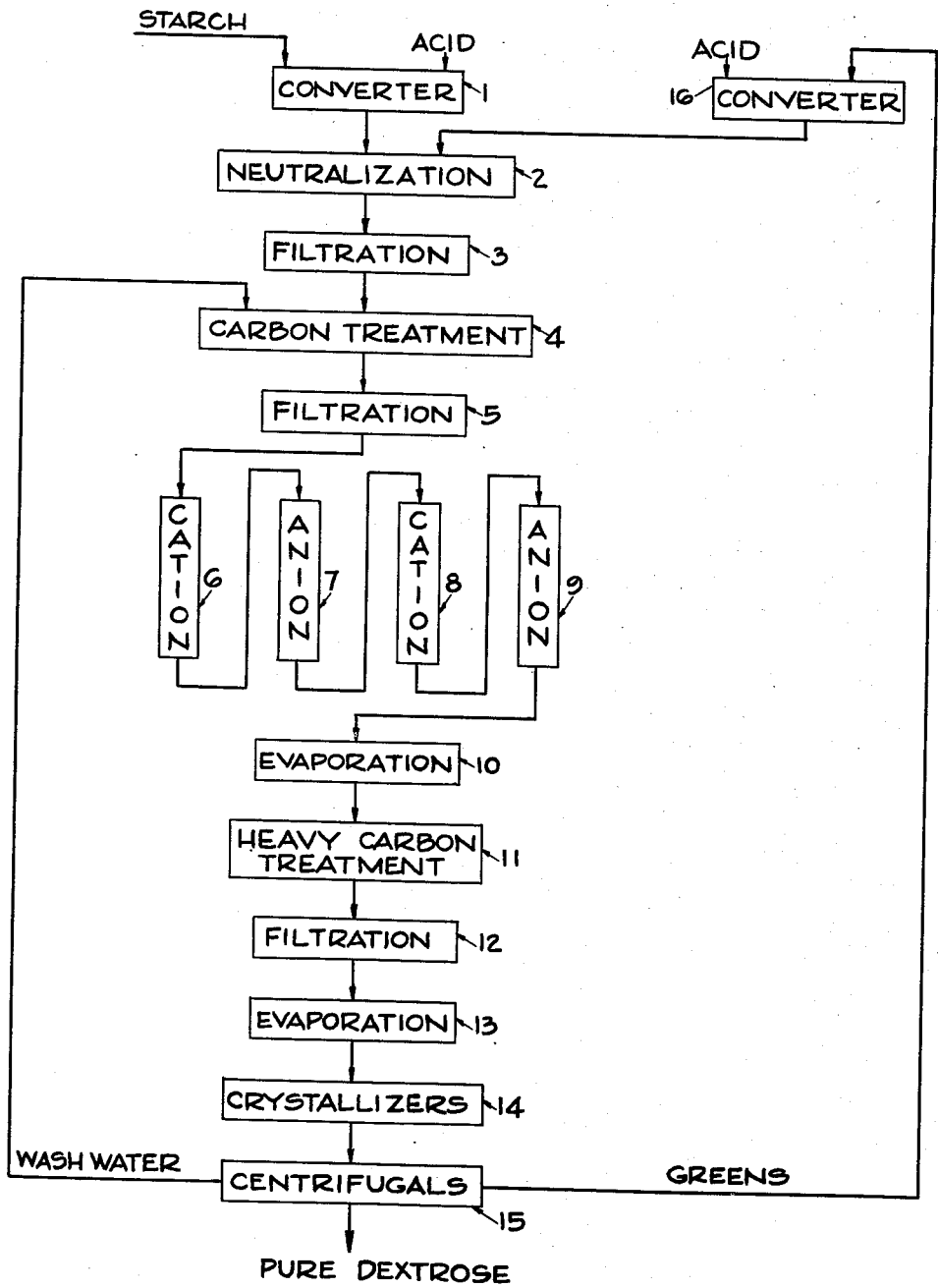

2,606,847

UNITED STATES PATENT OFFICE 2,606,847

PROCESS FOR THE PRODUCTION OF DEXTROSE

William B. Newkirk, La Grange, and Arthur D. Hapke, Bedford Park, Ill., assignors to Corn Products Refining Company, New York, N. Y., a corporation of New Jersey Application August 6, 1949, Serial No. 108,944

16 Claims. (Cl. 127—40)

This invention relates to an improved method for producing pure crystalline dextrose in increased yield from starch converted dextrose solutions.

It has been known for some time to prepare pure crystalline dextrose from starch. The commercial procedure usually employed follows the principles described in Newkirk Patents Nos. 1,471,347, October 23, 1923, and 1,521,830, January 6, 1925.

In the usual commercial procedure, there is obtained a certain amount of crystalline dextrose from a given amount of starch converted dextrose solution and there is always left over a mother liquor containing a certain amount of dextrose. Such mother liquor may be concentrated and allowed to crystallize and additional crystalline dextrose obtained thereby. However, such dextrose is not of the same quality as that obtained from the first crystallizing operation. Furthermore, there still remains a mother liquor after each crystallization and it has never been practical to recover all of the dextrose present in the starch converted dextrose solution, in pure crystalline form. The mother liquor contains the salt of neutralization and also other salts which are present in starch converted dextrose solutions. These interfere with crystallization of dextrose. The mother liquor also contains reversion products which also interfere with the crystallization of dextrose. As the number of crystallizations from the mother liquor is increased, the salts and the reversion products become more and more concentrated and prevent the recovery of all of the dextrose present.

In order to improve the yield of crystalline dextrose from mother liquors, it has been proposed to reconvert the mother liquors to form more dextrose therefrom, thus to allow more dextrose to crystallize. Such procedures are described in U. S. Patents No. 1,673,187, June 12, 1928; No. 1,704,037, March 5, 1929, and No. 2,109,585, March 1, 1938.

However, even when the mother liquor is reconverted as above described, the highest yield of crystalline dextrose obtainable from a given amount of converter liquor in usual commercial operations is about 82 percent; 54 percent of this being first quality dextrose, i. e. that corresponding to the dextrose from the first crystallizer; about 21 percent of the crystalline dextrose being second quality dextrose obtained from reconverted mother liquors. About 7 to 9 percent of crystalline dextrose is recovered from various wash waters. There is also obtained 18 percent of mother liquor with a dextrose equivalent (or D. E. value) of 72 from which it is impractical and uneconomical to attempt to obtain more crystalline dextrose. (The term dextrose equivalent, as used herein, means the percent of reducing sugar, calculated as dextrose, on dry basis.) Reconversion of this low D. E. mother liquor is not practical on account of the very high ash content and, also, on account of the presence of destruction products which interfere with the refining of the raw dextrose product.

It has also been proposed to use ion exchange resins to refine dextrose liquors from the acid hydrolysis of starch with a view to increasing the amount of pure crystalline dextrose obtainable therefrom. However, even though such methods are improvements over those previously mentioned there is either still left over some mother liquor from which it is not possible to recover pure crystalline dextrose in substantial yield or the dextrose obtainable is not of uniform high quality.

It is an object of the present invention to provide a method of obtaining from starch hydrolysate liquors the dextrose contained therein in amount approaching the theoretical amount, and to recover this in crystalline form and in uniformly high quality which heretofore has been obtained only in so-called "first" dextrose sugar. It is a further object to provide a process for making crystalline dextrose from starch hydrolysate liquors, in which process there is no residual mother liquor from which crystalline dextrose is not recovered. It is a further object of the present invention to provide a closed or substantially closed system for making crystalline dextrose, i. e. one in which it is possible to return to the process all liquors and recover in cyrstalline form substantially all the dextrose theoretically possible. A further object is to simplify the refining or crystallizing process so as to reduce both capital cost and labor requirements while improving the process and quality of the product produced. Other objects will appear hereinafter.

The invention consists, essentially, in first subjecting acid starch hydrolysate liquor to a succession of steps with ion exchange resins to de-mineralize and refine it. This treatment may be applied directly to the acid starch hydrolysate liquor without neutralization of the acid therein, in which case the liquor is given a pretreatment with bentonite and optionally with activated carbon to clarify it. Or the acid starch hydrolysate liquor may be neutralized, i. e. the pH adjusted to about 5.0, and filtered, in the customary manner and then subjected to the de-mineralization and refining treatment with ion exchange resins. After the de-mineralization and refining treatment, the liquor is concentrated, treated with activated carbon for final removal of color and crystallized. The massecuite is purged of its mother liquor. Thereafter, the mother liquor preferably is reconverted separately and combined with freshly converted starch hydrolysate liquor although the mother liquor and starch may be converted together. The combined liquors are de-mineralized and refined with ion exchange resins as above described. Optionally, the reconverted liquor before or after neutralization may be de-mineralized and refined separately, as above described, and then added to freshly converted starch hydrolysate liquor which has also been de-mineralized and refined in similar manner. Finally the combined de-mineralized and refined liquors are concentrated and crystallized, as above described.

The terms "de-mineralize" and "de-mineralization," as used herein, are intended to mean to remove or the removal of acidic substances, e. g. the converting acid; organic acids, e. g. amino acids, levulinic acid, etc., formed during the hydrolysis of starch; and mineral and organic salts. The term "refining," as used herein, is intended to mean the removal of materials, such as hydroxymethylfurfural which gives rise to color bodies, some or all of various colored bodies present in starch hydrolysate liquor and residual colloidal materials not removed by previous clarification treatment. The term refining is also intended to include the removal of non-dextrose substances which interfere with crystallization of dextrose and color removal with carbon and the removal of which by means of ion exchange resins increases the D. E. value of the starch hydrolysate liquor. When starch hydrolysate liquor is treated with ion exchange resins, as above described, there is an increase in D. E. value which apparently cannot be accounted for entirely on the basis of removal of non-dextrose substances such as ash and acidity.

The nature of the invention will more fully appear from the following description. The examples should be considered as typical and informative only and not in a limiting sense.

*Example 1*

Referring to Figure 1 of the flow sheets annexed hereto, a preferred process involving the several improvements of the invention is as follows:

A starch and water suspension having a density of 9.2° Baumé (8-11) and containing sufficient sulfuric acid to give it a normality of 0.03 (0.02-0.04) is introduced into the converter 1 and hydrolyzed at 323° F. (290-350° F.) for 18 minutes (10-30) to give the starch hydrolysate liquor a dextrose equivalent (D. E.) value of 90 (89-92). The figures, in parenthesis, in this and in the following parts of the description, indicate ranges which are practical and working ranges, not critical ranges, unless otherwise specified. The percentages, unless otherwise specified, are on dry substance basis.

The liquor converted at 1 is introduced into a vessel 2 with about 0.5 percent of bentonite or equivalent clay and the material mixed together for from 5 to 10 minutes to coagulate impurities such as colloids. Optionally the bentonite may be added in two doses of about 0.3 percent each with or without filtration after each addition. The liquor is then filtered at 3.

The liquor filtered at 3 is preferably treated at 4 with color removing activated vegetable carbon. This may be virgin carbon or carbon which has been used one or more times but still retains color removing capacity.

The liquor filtered at 5 is cooled to about 145° F. or below, depending upon the type of ion exchange resin used in subsequent treatment, and is now treated with anion and cation exchange resins in granular form to de-mineralize and refine it. It is first introduced into a column 6 containing an anion exchange resin. The pH of the effluent liquor from the treatment at 6 will be about 4.0 (5-3.9).

The liquor from 6 is now introduced into a column 7 containing a cation exchange resin from which it emerges with a pH of about 3.0 (3.0-3.9).

Next the liquor is passed successively through column 8, containing an anion exchange resin from which it emerges with a pH of 5.0 (6.0-4.5); then through column 9, containing a cation exchange resin from which it emerges with a pH of 3.5 (4.0-3.0); then through column 10, containing an anion exchange resin from which it emerges with a pH of 6.0 (7.5-5.5), and finally through column 11 containing a cation exchange resin from which it emerges with a pH of 4.0 (3.5-5.4).

The treatment with the ion exchange resins is effected in counter-current manner, the fresh or freshly regenerated resins being used in the last columns. Regeneration of the resins is effected in conventional manner.

The de-mineralized and refined liquor is concentrated in evaporators at 12 to 30° Baumé (26-32). It is then treated at 13 with virgin activated carbon to remove residual color. The liquor after filtration at 14 is now concentrated at 15 to a density of 39° Baumé (37.5-41.5 Baumé), then cooled and introduced into crystallizer 16. The crystallization procedure follows the principles of U. S. Patents 1,471,347 and 1,521,830 referred to above.

The massecuite from crystallizer 16 is discharged to centrifuge 17 where, after being purged of the mother liquor, the body of dextrose is washed with water. The wash water is returned to the process at 3. The pure dextrose is discharged from centrifuge 17 and is dried and packed in conventional manner.

The motor liquor or greens discharged from centrifuge 17 is adjusted to a density of 10.4° Baumé (8-11), mixed with sufficient sulfuric acid to give it a normality of 0.025 (0.015-0.05), introduced into converter 18 and hydrolyzed at 302° F. (285°-350° F.) for 30 minutes (10-50) to give the reconverted greens a D. E. value of 90 (89-91). The reconverted liquor is introduced into 2 along with freshly converted starch hydrolysate liquor and thereafter the combined liquors are de-mineralized and refined, concentrated and crystallized, as previously described. Obviously, the reconverted liquor may be clarified, de-mineralized and refined, and concentrated in a separate channel and added to freshly converted starch hydrolysate liquor similarly treated and the combined liquors subjected to crystallization.

The yield of dextrose expressed in conventional manner, e. g. on the basis of percent of dry substance, will be 95 percent or more of the starch hydrolysate liquor. The 5 percent or less loss of dry substance is due to the removal of ash, colloidal and organic impurities, e. g. substances which account for about 5 percent of the weight of the dry substance in starch hydrolysate liquor. Actually virtually all of the dextrose present in the starch hydrolysate liquor or potentially obtainable therefrom is recovered as pure, crystalline dextrose of high, uniform quality. Expressed in terms of dextrose recovered from the amount of dextrose theoretically obtainable, the yield is 98 percent or more. The only loss of dextrose, which is small at most, is that due to mechanical handling of the liquor.

The conversion may be made in conventional batch or continuous types of converters. A continuous converter which consists of an entry chamber where acidified starch suspension is mixed with steam through an instantaneous type of heater; a hydrolysis coil constructed of straight lengths of pipe connected by 180° return bends, arranged in horizontal or vertical banks where the major part of the hydrolysis takes place; and a flash chamber to receive the hydrolyzed product gives satisfactory results. Such continuous converter may be equipped with suitable valves and level controls to maintain a continuous flow through the system at the desired flow rate.

The conventional batch converter may be also used for conversion but a continuous type converter is preferred for the reason that it provides more uniform operation and is readily adaptable to automatic control.

Hydrochloric acid, sulfuric acid, or other suitable acid may be used as the converting acid.

The converter liquor, prior to treatment with an anion exchange resin to remove acidity from the liquor, may first be treated with a fresh cation exchange resin having a high demineralizing capacity, as compared to the cation resin later used, i. e. columns 7, 9 and 11.

*Example 2*

Referring now to Figure 2, an optional process, which involves removal of the acidity of the acid converted starch hydrolysate liquor by neutralization in conventional manner, followed by treatment involving the several improvements of the invention, will now be described.

A starch and water suspension having a density of 10.5 Baumé (8–12 Baumé) and containing sufficient hydrochloric acid or sulfuric acid to give it a normality of 0.03 (0.02–0.04) is converted at 1 at 45 lbs. steam pressure, per square inch, for 20 minutes (15–30 minutes) after the pressure has been built up, to produce a starch hydrolysate liquor with a D. E. value of 90–91.

The liquor is treated with sodium carbonate at 2 to adjust the pH to 5.0 (4.5–5.5). Thereafter, it is filtered at 3 and treated with activated carbon at 4 and filtered at 5.

Following this it is treated successively with a cation exchange resin at 6, the pH of the effluent liquor being about 3.0; an anion exchanger at 7, the pH of the effluent liquor being about 4.5; with a cation exchanger at 8, the pH of the effluent liquor being about 3.5; and with an anion exchanger at 9, the pH of the effluent liquor being 4.0 (3.5–5.4).

After the treatment with ion exchange resins, the liquor is evaporated at 10 to a density of 26–32, treated with carbon at 11, filtered at 12, evaporated at 13, cooled and crystallized at 14.

After crystallization, the massecuite from 14 is discharged to centrifuge 15, where after being purged of most of the mother liquor, the dextrose filter cake is washed with water. The wash water is returned to the process at 4. The pure crystalline dextrose is dried and packaged in conventional manner.

The greens discharged from centrifuge 15 is adjusted to a density of 10.4° Baumé (8–11), mixed with sufficient hydrochloric acid to give it a pH of 2 (1.5–2.5), and converted at 16 at 45 pounds' steam pressure, per square inch, for 20 minutes (15–30) after the pressure has been built up to give the reconverted greens a D. E. value of 90. The reconverted liquor is introduced into 2 along with freshly converted starch hydrolysate liquor, and thereafter the combined liquors are de-mineralized and refined, concentrated and crystallized, as previously described.

Obviously, the reconverted liquor may be neutralized, de-mineralized and refined, and concentrated in a separate channel and then added to freshly converted starch hydrolysate liquor similarly treated, and the combined liquors subjected to crystallization.

Any of the conventional ion exchange resins which are used to de-mineralize and refine various aqueous liquors may be used for purposes of the present invention. Typical cation exchange resins include those sold under the trade-mark Duolite C–3 by Chemical Process Company; Dowex–50 by Dow Chemical Company; Amberlite IR 120 and Amberlite IR 100 by Rohm and Haas Company; Permutit Q and Zeocarb H by The Permutit Company; Nalcite HCR by National Aluminate; Ionac C–200 by American Cyanamid Company.

Typical anion exchange resins which may be used for purposes of the present invention include those sold under the trade-mark Duolite A–3, Duolite A–4, Duolite A–6 by Chemical Process Company; De-Acidite by The Permutit Company; Amberlite IR4B by Rohm and Haas Company; and Ionac A–300 by American Cyanamid Company.

The treatment of the converter liquors with ion exchange resins to effect de-mineralization and refining is preferably carried out in a multiple pass system. Although a single pass system may be used, due to the types and capacities of ion exchange resins presently available, it is more economical to use a multiple pass system.

We claim:

1. In the process of obtaining crystalline dextrose from a liquor resulting from the acid conversion of starch which comprises subjecting said liquor to refining and crystallizing operations, the improvement which consists in successively subjecting said liquor to treatment with bentonite to clarify the liquor; a succession of de-mineralizing and refining steps in each of which the liquor is treated first with an anion exchange resin, then a cation exchange resin, next an anion exchange resin, and finally a cation exchange resin; with activated carbon for final decolorization of the liquor; thereafter concentrating the liquor and subjecting the concentrated liquor to crystallization; purging the massecuite of its mother liquor; reconverting the mother liquor; adding the reconverted mother liquor to freshly converted acidic starch liquor; and subjecting the mixture of liquors to the aforesaid treatment before crystallization whereby substantially all of the dextrose present in said liquors is recovered in pure crystalline form.

2. The process according to claim 1 wherein the pH of the liquor after de-mineralization and refining with the ion exchange resins is 3.5 to 5.4.

3. The process according to claim 1 wherein the liquor is treated with activated carbon after the treatment with bentonite and prior to the de-mineralization and refining treatment.

4. The process according to claim 1 wherein the pH of the liquor after de-mineralization and refining with the ion exchange resins is 3.5 to 5.4 and wherein the liquor is treated with activated carbon after treatment with bentonite and prior to the de-mineralization and refining treatment.

5. In the process of obtaining crystalline dextrose from a liquor resulting from the acid conversion of starch which comprises subjecting said liquor to refining and crystallizing operations, the improvement which consists in adjusting the pH of the liquor to 4.5 to 5.5 and removing colloidal materials; subjecting the liquor to treatment with cation and anion exchange resins to de-mineralize and refine it; with activated carbon for final decolorization of the liquor; thereafter concentrating the liquor and subjecting the concentrated liquor to crystallization; purging the massecuite of its mother liquor; reconverting the mother liquor; adding the reconverted mother liquor to freshly converted acidic starch liquor; and subjecting the mixture of liquors to the aforesaid treatment before crystallization whereby substantially all of the dextrose present in said liquors is recovered in pure crystalline form.

6. In the process of obtaining crystalline dextrose from a liquor resulting from the acid conversion of starch which comprises neutralizing said liquor and subjecting it to refining and crystallizing operations, the improvement which consists in subjecting said liquor after neutralization and filtration to treatment with cation and anion exchange resins to de-mineralize and refine the liquor and then with activated carbon for final decolorization of said liquor; thereafter concentrating the liquor and subjecting the concentrated liquor to crystallization; purging the massecuite of its mother liquor; reconverting the mother liquor; adding the reconverted mother liquor to freshly converted, acidic starch liquor and subjecting the mixture of liquors to the aforesaid treatment before crystallization whereby substantially all of the dextrose present in said liquors is recovered in pure crystalline form.

7. In the process of obtaining crystalline dextrose from a liquor resulting from the acid conversion of starch which comprises neutralizing said liquor and subjecting it to refining and crystallizing operations, the improvement which consists in subjecting said liquor after neutralization and filtration to treatment with cation and anion exchange resins to de-mineralize and refine the liquor and then with activated carbon for final decolorization of said liquor; thereafter concentrating the liquor and subjecting the concentrated liquor to crystallization; purging the massecuite of its mother liquor; reconverting the mother liquor; subjecting the reconverted liquor after neutralization and filtration to said treatment with cation and anion exchange resins and with activated carbon; thereafter concentrating the reconverted liquor and adding the concentrated reconverted liquor to said concentrated liquor and subjecting the combined liquors to crystallization whereby substantially all of the dextrose present in said liquors is recovered in pure crystalline form.

8. In the process of obtaining crystalline dextrose from a liquor resulting from the acid conversion of starch which comprises subjecting said liquor to refining and crystallizing operations, the improvement which consists in successively subjecting said liquor to treatment with bentonite to clarify the liquor; a succession of de-mineralizing and refining steps in each of which the liquor is treated first with an anion exchange resin, then a cation exchange resin, next an anion exchange resin, and finally a cation exchange resin; with activated carbon for final decolorization of the liquor; thereafter concentrating the liquor and subjecting the concentrated liquor to crystallization; purging the massecuite of its mother liquor; reconverting the mother liquor; subjecting the reconverted liquor to treatment with bentonite, anion exchange resin, cation exchange resin, anion exchange resin, cation exchange resin and activated carbon as above described; thereafter concentrating the reconverted liquor and adding it to said concentrated liquor and subjecting the combined liquors to crystallization whereby substantially all of the dextrose present in said liquors is recovered in pure crystalline form.

9. In the process of obtaining crystalline dextrose from a liquor resulting from the acid conversion of starch which comprises subjecting said liquor to refining and crystallizing operations, the improvement which consists in successively subjecting said liquor to treatment with a clarifying clay to clarify the liquor; a succession of de-mineralizing and refining steps in which the liquor is treated with an anion exchange resin, in the first position, and with a cation exchange resin, in the second position; with activated carbon for final decolorization of the liquor; and thereafter concentrating the liquor and subjecting the concentrated liquor to crystallization; purging the massecuite of its mother liquor; reconverting the mother liquor; adding the reconverted mother liquor to freshly converted acidic starch liquor; and subjecting the mixture of liquors to the aforesaid treatment before crystallization whereby substantially all of the dextrose present in said liquors is recovered in pure crystalline form.

10. In the process of obtaining crystalline dextrose from a liquor resulting from the acid conversion of starch which comprises subjecting said liquor to refining and crystallizing operations, the improvement which consists in clarifying said liquor with a clay; subjecting the liquor to treatment with ion exchange resins in which the anion resin is in the first position and the cation resin is in the second position, to de-mineralize and refine the liquor; with activated carbon for final decolorization of the liquor; thereafter concentrating the liquor and subjecting the concentrated liquor to crystallization; purging the massecuite of its mother liquor; reconverting the mother liquor; adding the reconverted mother liquor to freshly converted acidic starch liquor; and subjecting the mixture of liquors to the aforesaid treatment before crystallization whereby substantially all of the dextrose present in said liquors is recovered in pure crystalline form.

11. In a process for obtaining crystalline dextrose from a liquor resulting from the acid conversion of starch which includes the preliminary treatment of adjusting the pH of said liquor to within the range of from about 3.9 to about 5.5 and removing the colloid material therefrom; the improvement of subsequently treating the liquor obtained from said preliminary treatment which consists of passing said liquor through cation and anion exchange resins to demineralize and refine the liquor; passing the effluent liquor over activated carbon for final decolorization of the liquor; thereafter concentrating the decolorized liquor and subjecting the concentrated liquor to crystallization; purging the massecuite of its mother liquor; reconverting the mother liquor; subjecting said reconverted mother liquor to said preliminary and subsequent treatments; and crystallizing said reprocessed mother liquor while it is admixed with said concentrated liquor; whereby substantially all of the dextrose present in said mixture of liquors is recovered in pure crystalline form.

12. In a process for obtaining crystalline dextrose from a liquor resulting from the acid conversion of starch which includes the preliminary steps of adjusting the pH of said liquor to within the range of from about 3.9 to 5.5 and removing the colloid material therefrom; the improvement of subsequently treating the liquor obtained from said preliminary steps which consists of passing said liquor through cation and anion exchange resins to de-mineralize and refine the liquor; passing the effluent liquor over activated carbon for final decolorization of the liquor; thereafter concentrating the decolorized liquor and subjecting the concentrated liquor to crystallization; purging the massecuite of its mother liquor; mixing the mother liquor with fresh starch and converting the mixture; and thereafter subjecting the resultant liquor to said preliminary steps and to said subsequent treatment before crystallization whereby substantially all of the dextrose present in said liquor is recovered in pure crystalline form.

13. In the process of obtaining crystalline dextrose from a liquor resulting from the acid conversion of starch which comprises subjecting said liquor to refining and crystallizing operations, the improvement which consists in successively subjecting said liquor to treatment with bentonite to clarify the liquor; a succession of de-mineralizing and refining steps in each of which the liquor is treated first with an anion exchange resin, then a cation exchange resin, next an anion exchange resin, and finally a cation exchange resin; with activated carbon for final decolorization of the liquor; thereafter concentrating the liquor and subjecting the concentrated liquor to crystallization; purging the massecuite of its mother liquor; mixing the mother liquor with fresh starch and converting the mixture; and subjecting the resultant liquor to the aforesaid treatment before crystallization whereby substantially all of the dextrose present in said liquors is recovered in pure crystalline form.

14. The process according to claim 13 wherein the liquor is treated with activated carbon after the treatment with bentonite and prior to the de-mineralization and refining treatment.

15. In the process of obtaining crystalline dextrose from a liquor resulting from the acid conversion of starch which comprises neutralizing said liquor and subjecting it to refining and crystallizing operations, the improvement which consists in subjecting said liquor after neutralization and filtration to treatment with cation and anion exchange resins to de-mineralize and refine the liquor and then with activated carbon for final decolorization of said liquor; thereafter concentrating the liquor and subjecting the concentrated liquor to crystallization; purging the massecuite of its mother liquor; subjecting the mother liquor in combination with fresh starch to acid conversion; and subjecting the resultant liquor to the aforesaid treatment before crystallization whereby substantially all of the dextrose present in said liquors is recovered in pure crystalline form.

16. In the process of obtaining crystalline dextrose from a liquor resulting from the acid conversion of starch which comprises subjecting said liquor to refining and crystallizing operations, the improvement which consists in successively subjecting said liquor to treatment with a clarifying clay to clarify the liquor; a succession of de-mineralizing and refining steps in which the liquor is treated with an anion exchange resin, in the first position, and with a cation exchange resin, in the second position; with activated carbon for final decolorization of the liquor; and thereafter concentrating the liquor and subjecting the concentrated liquor to crystallization; purging the massecuite of its mother liquor; subjecting the mother liquor in combination with fresh starch to acid conversion; and subjecting the resultant liquor to the aforesaid treatment before crystallization whereby substantially all of the dextrose present in said liquors is recovered in pure crystalline form.

WILLIAM B. NEWKIRK.
ARTHUR D. HAPKE.

REFERENCES CITED

The following references are of record in the file of this patent:

UNITED STATES PATENTS

| Number | Name | Date |
| --- | --- | --- |
| 1,673,187 | Ebert et al. | June 12, 1928 |
| 2,109,585 | Copland | Mar. 1, 1938 |
| 2,389,119 | Cantor | Nov. 20, 1945 |
| 2,490,716 | Smith et al. | Dec. 6, 1949 |